Feb. 17, 1959 F. J. BIONDI ET AL 2,874,341

OHMIC CONTACTS TO SILICON BODIES

Filed Nov. 30, 1954

INVENTORS: F. J. BIONDI
H. M. CLEVELAND
MILES V. SULLIVAN

BY Arthur J. Torsiglieri
ATTORNEY

United States Patent Office 2,874,341
Patented Feb. 17, 1959

2,874,341

OHMIC CONTACTS TO SILICON BODIES

Frank J. Biondi, Livingston, Hugh M. Cleveland, Chatham, and Miles V. Sullivan, Summit, N. J., assignors to Bell Telephone Laboratories, Incorporated, New York, N. Y., a corporation of New York Application November 30, 1954, Serial No. 472,026

11 Claims. (Cl. 317—240)

Figure 1:
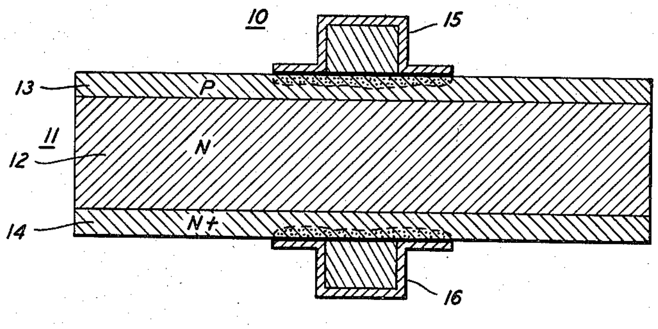

This invention relates to silicon semiconductive devices and to methods for their fabrication.

In many classes of semiconductive devices it is important to provide to the semiconductive wafer or body an electrode connection thereto which is permanent and sturdy mechanically and of low resistance electrically. Permanence and sturdiness of the connection are important for long life, low resistance is important to minimize resistance losses which limit the current handling capacity of the devices. It has been especially difficult hitherto to make such permanent low resistance connections to semiconductive bodies of highly purified silicon. This is especially unfortunate since in many respects silicon is the ideal semiconductor for use in devices which are to handle large currents. For example, silicon has shown considerable promise for use in rectifiers as described in a copending application Serial No. 414,275, filed March 5, 1954, by G. L. Pearson, now abandoned, in lightning surge protectors as described in copending application Serial No. 414,332, filed March 5, 1954, by C. S. Fuller and G. L. Pearson, and in solar batteries as described in copending application Serial No. 414,273, filed March 5, 1954, by D. M. Chapin, C. S. Fuller, and G. L. Pearson, now Patent No. 2,780,765. In each of these classes of devices it is important that the resistance of the connection to the silicon body incorporated therein be very low, for example, a small fraction of an ohm.

Accordingly, an object of the present invention is to facilitate the making of a low resistance connection to a highly purified silicon body.

Corollary objects are to improve the performance and increase the current capacity of semiconductive devices which utilize silicon.

The invention is based to a considerable extent on the discovery that some common brazing or soldering agents, such as lead, tin, or alloys thereof, which ordinarily will not wet an ordinary silicon surface uniformly can be made to do so when a trace of an alloying agent comprising a hydride taken from the group of zirconium, titanium, niobium, tantalum, thorium and vanadium is introduced on the silicon surface for alloyage with the brazing agent.

The use of brazing mixtures of this general kind has been known hitherto in techniques for making hermetic seals between metal and ceramic surfaces. However, in such applications the electrical properties of the contact were not of major concern and it was not appreciated that this technique could be adapted to making a good low resistance electrical contact to a semiconductor, such as purified silicon, which had not previously lent itself readily to other known bonding techniques.

The use of a silver zirconium alloy in forming an electrical contact member to be used in making a pressure contact in relays has also been known hitherto, but such an alloy is not well suited for forming a permanent mechanical contact with a silicon body for various reasons. Among the most important is that a silicon silver eutectic freezes at about 830° C. and the large difference in coefficients of thermal expansion between the silicon silver alloy and purified silicon in cooling from this temperature to room temperature sets up severe stresses which crack the contact. On the other hand, tin silicon, lead silicon, and lead tin silicon alloys freeze at much lower temperatures and therefore the net stress on the silicon is considerably less. Moreover, what little stress does arise is readily relieved by straining the softer contacting material rather than the silicon.

It is generally advantageous in the manufacture of devices in accordance with the invention to apply the alloying agent in hydride form to the surface of the silicon body at the region desired to contact. The brazing agent is thereafter deposited on this region. To hold the brazing agent in place during the heating cycle until such time as the hydride decomposes to liberate the alloying agent in elemental form, the brazing agent advantageously is confined to the region desired to contact by some carrier element, such as a cap. By the use of two such caps on opposite sides of the silicon body, it is possible to make contact to opposite surfaces of the body in a single heating cycle.

Various devices in accordance with the invention will be described each being characterized by a silicon body having a low resistance connection thereto comprising an alloy of a suitable brazing agent and an alloying agent taken from the group of zirconium, titanium, niobium, tantalum, thorium and vanadium. In some of these devices it is important to make a low resistance contact to a very thin surface zone of a given conductivity type without making a shorting contact to the interior zone of opposite conductivity type. In such cases, to minimize the need for close control of the brazing depth it is advantageous to include in the brazing mixture along with the brazing agent and alloying agent a significant impurity element of the type predominant in the surface zone whereby any penetration of the brazing mixture to the interior zone will result there in a rectifying contact of high resistance which has no significant shorting effect. Moreover, a modification of this technique makes possible separate low resistance contacts to both the surface and interior zones of such a body. In such a process there is employed two separate brazing mixtures, each including a brazing agent, an alloying agent in accordance with the invention, and a significant impurity element. Advantageously, the two brazing mixtures have significant impurities characteristic of opposite conductivity type and different penetration characteristics achieved by different alloying agents. It is also advantageous sometimes to employ different alloying agents for the two mixtures having different temperature characteristics to achieve different depths of penetration for the two brazing mixtures.

Figure 2:
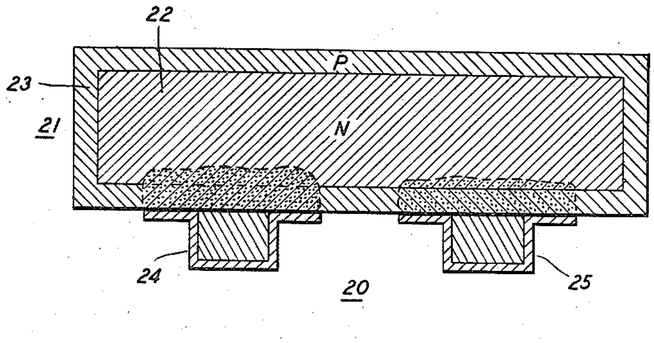

The invention will be better understood from the following more detailed description taken in connection with the accompanying drawings in which:

Fig. 1 shows a rectifier including a silicon body having contacts made thereto in accordance with the invention; and Fig. 2 shows a photovoltaic element including a silicon body having contacts made thereto in accordance with the invention.

In each of these figures, for clarity of exposition the drawing is not to scale.

With reference now more particularly to the drawings, in the rectifier 10 shown in Fig. 1 a monocrystalline silicon body 11 has an interior zone 12 which is of n-type conductivity which can, for example, be the result of the presence of arsenic introduced, for example, during the crystal growing process. On one surface of the body there is a thin p-type zone 13 formed, for example, by the diffusion of boron therein and on the opposite surface there is a thin n+-type zone 14, where the designation n+ is used to indicate a higher concentration of uncompensated donor elements than that by the designation n. Such an n+ surface may be formed by the diffusion therein of phosphorus. Electrode connections 15 and 16 in accordance with the invention make low resistance ohmic connections to zones 13 and 14, respectively. The alloyage region associated with each electrode connection is shown stippled. Each of these electrode connections is of an alloy which includes a brazing agent, such as lead or tin or mixtures thereof, and an alloying agent taken from the group of zirconium, vanadium, niobium, tantalum, thorium and titanium preferably reduced from its hydride form. Advantageously, although not necessarily, the alloy forming electrode connection 15 includes an acceptor impurity such as aluminum, gallium or indium, and that forming electrode connection 16 a donor impurity such as phosphorus, arsenic or antimony. Each electrode advantageously is cap-shaped for reasons to be discussed in more detail below.

The electrode connections advantageously may be formed by the following method. The surfaces of the silicon body are first cleaned by immersion of the body in a 48 percent aqueous solution of hydrofluoric acid, rinsing it in distilled water and blotting it dry. There is then applied on the surfaces to which connection is to be made a suspension of zirconium hydride in an organic vehicle such as a solution of nitrocellulose in amyl acetate. A thin even film is preferable and this is best deposited by spraying. To minimize spillover, there is left an unsprayed border along the surfaces to which the connections are to be made. A cap which, for example, may be of Kovar or molybdenum is used as a container for the brazing agent until such time as it is able to wet the silicon surface. The cap advantageously is calorized or otherwise treated on its outside surface to keep the brazing agent from wetting such surface and tinned with the brazing agent on the inside, the saucer shape resulting in a retention of a reservoir of the brazing agent. By positioning caps of this kind on opposite surfaces of the body there is achieved a sandwich which may be held together by spring action until such time as the unit is permanently integral. An assembly of this kind is then introduced slowly over a period of from one to two minutes in an open-end furnace which is continuously flushed with a nonoxidizing gas, such as nitrogen, and maintained at a temperature of about 920° C. The unit is kept at the temperature of 920° C. for about one minute and then removed slowly over a period of from one to two minutes. The rate of decomposition of the hydride is a function of the furnace temperature. Until such decomposition, little alloyage of the brazing mixture with the silicon occurs. After such decomposition the elemental zirconium alloys with the brazing agent to form a brazing mixture which alloys with the silicon. Because of the dependence of the rate of decomposition on the furnace temperature, the time at which alloyage into the silicon begins may be controlled.

In applications of this kind the n- and p-type zones are generally of sufficient thicknesses that it is relatively easy to control the depth of penetration of the contact so that no shorting of the p-n junction therein results. Although the n+ skin is relatively thin, penetration therethrough by the contact is not serious. As a matter of fact, such a skin is now almost superfluous in the light of this improved contact since such a skin was used hitherto primarily to compensate for the shortcomings of the contacts then being used. The elimination of such a skin facilitates the process for making such silicon wafers.

However, in some applications there is advantageously employed a relatively thin surface skin of conductivity type opposite to that of the interior of the body. In Fig. 2 there is shown a photovoltaic cell 20 suitable for use as the photosensitive cell either in a solar battery or in a light exposure meter for use in photography. The cell comprises a body of monocrystalline silicon 21 which has an interior 22 of n-type conductivity formed, for example, by the addition of arsenic during the crystal growing process. Additionally, there is formed over the surface of the body a skin 23 a fraction of a mil thick of p-type conductivity formed, for example, by the diffusion therein of a donor impurity such as boron. Hitherto, it has been necessary to etch away a portion of this skin in order to make ohmic connection to the inner portion. On the other hand, because of the difficulty in making ohmic connection to this thin skin without shorting across the junction, it has often been the practice to build up, i. e., thicken, the p-type skin at the region to which the ohmic connection is to be made. Both these techniques involve extra steps which are obviated by the practice of the invention with consequent economies in the process of manufacture of devices of this kind.

To this end, there are prepared different brazing mixtures for the separate connections 24 and 25. The connection to be made to the n-type skin, for example, would be made with a brazing mixture characterized by a trace of a donor impurity while the brazing mixture for the p-type connection is characterized by an acceptor impurity. It is advantageous for obvious reasons to limit the depth of penetration into the interior zone of the brazing mixture intended for connection to the outer zone. It is further advantageous to have the two connections made in a single heating cycle. All these ends can be achieved by appropriate choice of either the brazing agent or the alloying agent of the mixtures. For example, the selection of either vanadium or titanium hydride which decompose at a relatively low temperature of about 500° C. as the alloying agent for the brazing mixture for the connection to be made to the interior zone and the selection of zirconium hydride which decomposes at about 825° C. as the alloying agent for the brazing mixture for the connection to the surface zone permits all these ends to be achieved. After separate deposition of the appropriate alloying agents on two spaced regions of the surface, a first cap which is tinned with the donor-type brazing mixture is positioned on the titanium hydride treated region and a second cap which is tinned with the acceptor-type brazing mixture is positioned on the zirconium hydride treated surface. Thereafter, the assembly is heated as described above in a furnace at a temperature about 850° C. for the decomposition of both hydrides. However, because of the lower decomposition temperature of the titanium hydride, the depth of penetration of the brazing mixture associated therewith will be larger than that of the brazing mixture associated with zirconium hydride, provided the assembly is removed from the furnace shortly after wetting begins at the higher temperature. The depth of penetration of the former mixture can readily be made sufficient to provide good ohmic contact to the interior zone and, at the same time providing only inappreciable depth of penetration for the latter mixture. Moreover, because of the donor elements associated with the former brazing mixture, the contact made thereby with the p-type surface zone will be rectifying and so of high resistance. On the other hand, the contact of the brazing mixture including the acceptor element will be ohmic with respect to the p-type surface zone and rectifying with respect to the n-type interior zone.

Alternatively, comparable results may be achieved by the use of the same hydride as the alloying agent for the two brazing mixtures, and the desired differential in the depth of penetration attained instead by the use of brazing agents of different melting characteristics. For example, associated with the connection intended to be ohmic with the interior zone there may be employed as the brazing agent a tin lead alloy which with the alloying agent and silicon forms a mixture which melts at a lower temperature than when pure lead is used as the alloying agent, and pure lead is used as the brazing agent for the connection intended to be ohmic to the surface zone.

It is, of course, feasible to employ simultaneously both techniques described for achieving different depths of alloyage to the silicon body.

The use of a brazing mixture which will result in good connections at as low a temperature as possible has special importance where high lifetime of minority carriers in silicon is important, since heating of silicon generally results in a deterioration of such lifetime. Junction transistors are typical of applications in which a high lifetime is important. Accordingly, in the fabrication of such devices when using the hydride technique described, it is advantageous to use vanadium and titanium hydrides instead of zirconium hydride because their lower decomposition temperature makes it feasible to operate with lower furnace temperatures for brazing.

Although in the processes described above, the alloying agent has been sprayed on the silicon surface to which connection is to be made, it is feasible in some instances to use instead a solder cored with an alloying agent of this kind. When this technique for incorporating the alloying agent is employed, the hydride or the metal in elemental form may be used. In the latter case, the brazing may ordinarily be done at lower temperatures than when the hydrides are used.

It should be evident at this point that the various embodiments specifically described are merely illustrative of the general principles of the invention. Various modifications may be devised by one skilled in the art without departing from the spirit and scope of the invention. For example, although the invention has primary application to making good electrical connections to highly purified elemental silicon, both of monocrystalline and polycrystalline form, it may be applied to the making of good electrical connections to silicon semiconductive compounds, such as silicon carbide, and to silicon semiconductive alloys, such as silicon germanium alloys. In a generic sense, such semiconductive bodies may be characterized as including as an essential ingredient silicon in one of its oxidation states. Additionally, to a lesser extent the principles of the invention may be extended to making electrical connections to highly purified elemental germanium.

What is claimed is:

1. A silicon semiconductive device comprising a high purity monocrystalline silicon body having at least one low resistance electrode connection thereto formed of a brazing mixture including a brazing agent and an alloying agent taken from the group of titanium, vanadium, niobium, tantalum, thorium and zirconium.

2. A silicon semiconductive device comprising a high purity silicon body having at least one low resistance electrode connection thereto formed of a brazing mixture including a brazing agent and an alloying agent taken from the group of titanium, niobium, tantalum, thorium, vanadium and zirconium.

3. A semiconductive device comprising a semiconductive body including as an essential ingredient silicon in one of its oxidation states and having at least one low resistance permanent connection thereto formed of a brazing mixture including a brazing agent and an alloying agent taken from the group of titanium, niobium, tantalum, thorium, vanadium and zirconium.

4. A semiconductive device comprising a high purity monocrystalline silicon body having one low resistance electrode connection thereto formed of a brazing mixture including a brazing agent taken from the group of lead, tin and lead tin alloys and an alloying agent taken from the group of titanium, vanadium, niobium, tantalum, thorium and zirconium.

5. A semiconductive device according to claim 4 in which the brazing mixture is further characterized as including a significant impurity element.

6. A rectifier comprising a monocrystalline silicon body including contiguous p- and n-type conductivity zones and separate electrode connections to the two zones, each characterized as formed of a brazing mixture including a brazing agent and an alloying agent taken from the group of vanadium, zirconium, tantalum, niobium, thorium and titanium.

7. A rectifier according to claim 5 further characterized in that the brazing mixture for connection to the n-type zone is further chraacterized by a donor element and that for connection to the p-type zone by an acceptor element.

8. A semiconductive device comprising a monocrystalline silicon body having an interior zone of one conductivity type and a surface zone of opposite conductivity type including electrode connections forming separate low resistance ohmic connection to the two zones each being characterized as formed of a brazing mixture including a brazing agent and an alloying agent taken from the group of vanadium, zirconium, niobium, tantalum, thorium and titanium, the brazing mixture for connection to said interior zone also including a significant impurity of the type characteristic of said interior zone and the brazing mixture for connection to the surface zone also including a significant impurity of the type characteristic of said surface zone.

9. The method of forming a low resistance permanent electrode connection to a monocrystalline semiconductive silicon body comprising the step of applying to the silicon surface a brazing mixture including both an alloying agent taken from the group of vanadium, thorium, tantalum, zirconium, niobium and titanium hydrides and a brazing agent taken from the group of tin, lead and lead tin alloys, and heating the body in a nonoxidizing atmosphere to a temperature above the decomposition temperature of the hydride applied and above the melting point of the brazing agent.

10. The method of forming a low resistance connection to a semiconductive body comprising silicon in one of its oxidation states comprising the step of applying to a surface of the body a brazing mixture including a brazing agent and an alloying agent taken from the group of vanadium, tantalum, zirconium, thorium, niobium and titanium hydrides and the step of heating the body in a nonoxidizing atmosphere to a temperature above the decomposition point of the applied hydride and above the melting point of the brazing agent.

11. The method of forming separate low resistance ohmic connections to interior and surface zones of a high purity monocrystalline silicon body comprising the steps of applying to a first region of the surface of said body a brazing mixture including a brazing agent, a significant impurity element of the type characteristic of the interior zone and an alloying agent taken from the group of hydrides of vanadium, zirconium, tantalum, niobium, thorium and titanium and characterized by decomposition at a first temperature, applying to a second region of the surface of said body a brazing mixture including a brazing agent, a significant impurity element characteristic of the surface zone and an alloying agent taken from the group of hydrides of vanadium, zirconium, tantalum, niobium, thorium and titanium and characterized by decomposition at a second temperature higher than said first temperature, and heating the body in a nonoxidizing atmosphere to a temperature sufficiently high for decomposing the applied hydrides.

References Cited in the file of this patent

UNITED STATES PATENTS

| | | |
|---|---|---|
| 2,555,001 | Ohl | May 29, 1951 |
| 2,570,248 | Kelley | Oct. 9, 1951 |
| 2,603,693 | Kircher | July 15, 1952 |
| 2,644,852 | Dunlap | July 7, 1953 |
| 2,654,059 | Shockley | Sept. 29, 1953 |
| 2,668,923 | Bondley | Feb. 9, 1954 |
| 2,677,781 | Drieschman | May 4, 1954 |
| 2,701,326 | Pfann et al. | Feb. 1, 1955 |
| 2,702,360 | Giacoletto | Feb. 15, 1955 |
| 2,703,855 | Koch et al. | Mar. 8, 1955 |